United States Patent [19]

Matesa et al.

[11] 4,116,659

[45] Sep. 26, 1978

[54] APPARATUS AND METHOD FOR CIRCULATING MOLTEN METAL IN A BATH USED IN THE MANUFACTURE OF GLASS

[75] Inventors: Joseph Michael Matesa; Frank John Rau, both of Pittsburgh, Pa.

[73] Assignee: PPG Industries, Inc., Pittsburgh, Pa.

[21] Appl. No.: 764,250

[22] Filed: Jan. 31, 1977

[51] Int. Cl.$^2$ .............................................. C03B 18/02
[52] U.S. Cl. .................................. 65/99 A; 65/182 R
[58] Field of Search ................ 65/65 A, 99 A, 182 R

[56] References Cited

U.S. PATENT DOCUMENTS

| 3,479,171 | 11/1969 | Robinson et al. | 65/99 A |
|---|---|---|---|
| 3,607,203 | 9/1971 | Fujimoto et al. | 65/182 R |
| 3,647,408 | 3/1972 | Dickinson | 65/99 A |
| 3,653,869 | 4/1972 | Biagini | 65/182 R |
| 3,843,346 | 10/1974 | Edge et al. | 65/65 A |

*Primary Examiner*—Arthur O. Kellogg
*Attorney, Agent, or Firm*—E. Kears Pollock

[57] ABSTRACT

Method and apparatus are provided for circulating molten metal in a glass-supporting pool of molten metal in a direction counter to the advance of freshly delivered molten glass and outwardly into marginal spaces between glass restraining members and the side walls of the bath where it is subjected to forces establishing wave action in the surface of the pool of molten metal and then through means for dampening those waves to return the flow of molten metal to the main portion of the glass-supporting pool of molten metal whereby the metal can be purified and desirable thermal conditions can be established in the vicinity of the molten glass delivery onto the pool of molten metal.

10 Claims, 8 Drawing Figures

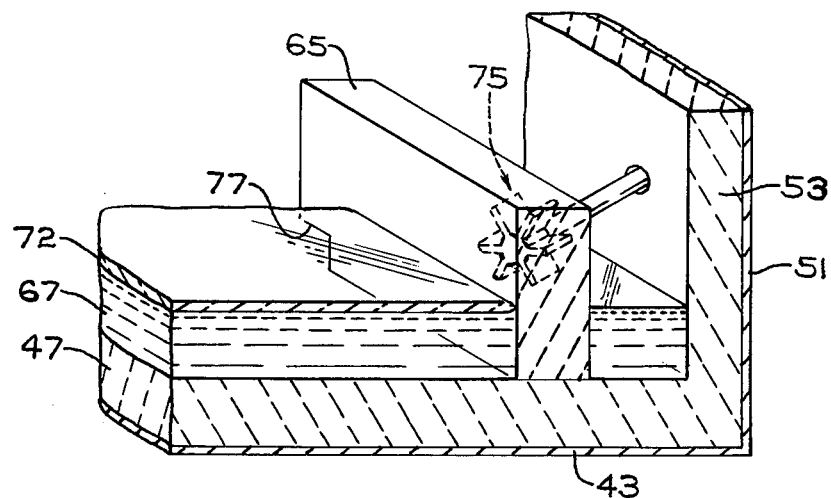
F I G. 3
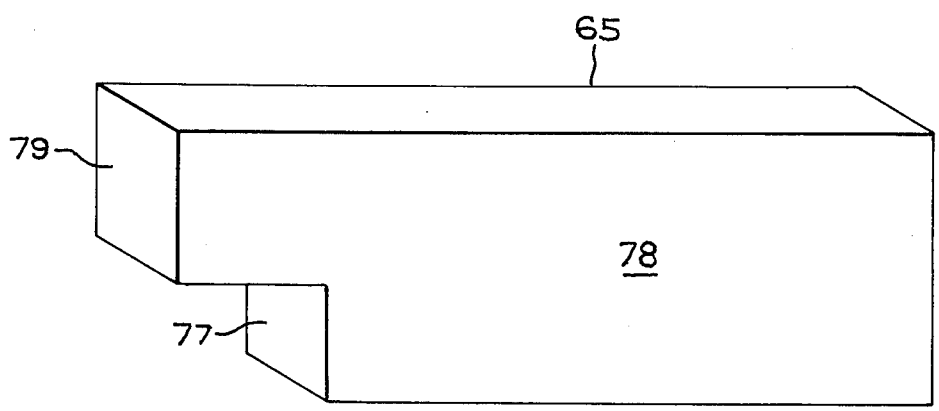
F I G. 4

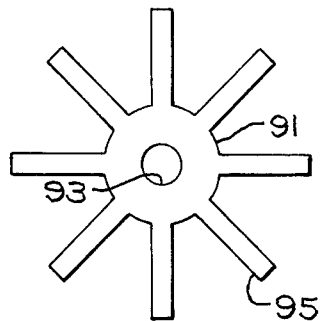
F I G. 5
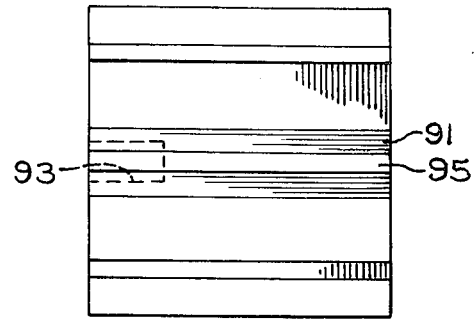
F I G. 6
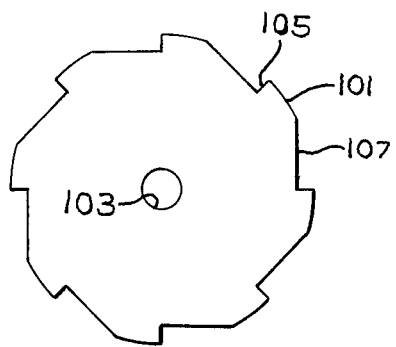
F I G. 7
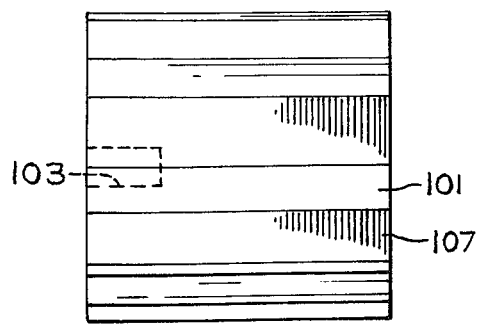
F I G. 8

APPARATUS AND METHOD FOR CIRCULATING MOLTEN METAL IN A BATH USED IN THE MANUFACTURE OF GLASS

BACKGROUND OF THE INVENTION

This invention relates to the manufacture of glass by a process in which molten glass is delivered onto and supported by a pool of molten metal during the formation of flat glass. In particular, this invention relates to improved method and apparatus for circulating molten metal within such a glass-supporting pool of molten metal.

It is known that a layer of molten glass may be continuously delivered onto a supporting pool of molten metal for forming and that the molten glass as initially delivered may be delivered between guides or restraining members which extend longitudinally in a glass forming chamber from the location of molten glass delivery to locations within such a forming chamber downstream from the point of delivery. An apparatus of this kind is shown in U.S. Pat. No. 3,843,346 to Edge et al. The restraining members or guides employed in such a device are generally spaced inwardly from the side walls of the forming chamber so that in the vicinity of the end of the forming chamber where molten glass is delivered to it the supporting pool of molten metal is divided into three portions: a main, central portion between the spaced restraining members upon which a layer of molten glass is directly delivered and two marginal portions of the pool, each of which is between a restraining member and the chamber side wall closest to it. The restraining members may be substantially parallel as illustrated in U.S. Pat. No. 3,843,346 or they may be arranged in a diverging relationship so that they are closer together at the location of molten glass delivery and more widely spaced at their terminal ends downstream from that location (downstream being defined as the direction in which glass is advanced through the forming chamber).

According to the teachings of Dickinson in U.S. Pat. No. 3,647,408, restraining members, which are illustrated in that patent as fenders, may be provided on either side of an advancing glass ribbon and means may be provided for pumping a portion of the molten metal in the glass-supporting pool of molten metal outwardly beneath each of the restraining members at their ends closest to the location at which molten glass is delivered to a forming chamber (that is, at their upstream end) and forcing the molten metal to flow in a generally downstream direction beyond the downstream ends of the restraining members and then inwardly to the central portion of the pool of molten metal. By virtue of a continuity of mass and momentum, the inwardly directed flows of molten metal at the downstream ends of the restraining members merge to establish an upstream directed flow of molten metal beneath the advancing layer of glass and counter to its direction of its advance. According to the teachings of Dickinson, the flow pattern established is useful for controlling thermal conditions within a forming chamber. The apparatus and method of Dickinson contemplates the use of electromagnetic induction motors as means for pumping the molten metal, the use of which devices substantially minimizes or eliminates any significant wave action in the surface of a pool of molten metal. The restraining members employed in the practice of the Dickinson invention are spaced at locations relatively remote from the location of molten glass delivery and are positioned at locations which permit and possibly require the unhindered spreading of a delivered layer of molten glass prior to encountering the described restraining members. U.S. Pat. No. 3,479,171 to Robinson et al describes the establishment of flows in a glass-supporting pool of molten metal which are substantially identical to the flows established according to the teachings of Dickinson. However, no longitudinal glass restraining members are disclosed to act as barriers between the marginally disposed, downstream directed flows and the centrally disposed, upstream directed flows within the pool of molten metal. Short transverse barriers are disclosed by Robinson et al as means for insuring that the outwardly directed flows of molten metal in the upstream portion of the forming chamber are redirected along the marginal portions of the chamber in a downstream direction.

U.S. Pat. No. 3,607,203 to Fujimoto et al discloses an apparatus and method for establishing flows about restraining members wherein the flows are in the same downstream direction as the advance of glass in the central portion of the forming chamber and then in an upstream direction in the marginal portions between the restraining members and the side walls of the forming chamber with resulting inwardly directed flows in that portion of the pool of molten metal closest to the location at which molten glass is delivered onto the pool of molten metal. This patent illustrates a puddle roller which may be positioned in a marginal space between a restraining member and a side wall of the forming chamber in order to control the flow of molten metal within the marginal portion of the pool. While the patent of Fujimoto et al recognizes the possibility of directing the flow of molten metal in either direction, there is no isolation of the molten metal at its surface between the three portions of the pool and therefore no arrangement for causing surface waves in the molten metal in the marginal portions alone.

In another environment of a float forming process and, in particular, in the downstream end portions of a float forming chamber, there may be provided means for removing dross from the surface of the glass-supporting pool of molten metal. Skimming devices are commonly provided in U.S. Pat. No. 3,653,869 to Biagini and illustrates a rotor that is provided with lands, which dip into the surface of molten metal as the rotor is rotated, and propels dross along the surface of the pool of molten metal. Since these lands dip into the molten metal, they may, if properly sized, establish a wave action in the surface of the pool of molten metal. The rotor of Biagini may be construed as an impeller for moving dross and molten metal and, thus, causing a flow of molten metal.

The patent to Fujimoto et al, in particular, is concerned with problems of impurities in the glass-supporting molten metal which may be the source of bottom surface defects in the glass produced, yet the methods and apparatus described in the patents mentioned above are not directed to any particular arrangements which would enhance the purification of the molten metal by the reducing atmosphere maintained in the space above the molten metal within a glass forming chamber. The present invention is directed to such a method and apparatus.

SUMMARY OF THE INVENTION

Flat glass is made by delivering a layer of molten glass onto a pool of molten metal between a pair of spaced restraining members which extend longitudinally from the location of molten glass delivery to a downstream location within an enclosed forming chamber. The molten glass is advanced as a layer between the restraining members along the surface of the pool of molten metal and beyond the downstream ends of the restraining members farther along the surface of the pool of molten metal while being cooled and having forces applied to it to form it into a dimensionally stable, continuous sheet or ribbon of glass which may be removed from the chamber for further treatment to provide flat glass articles for use as windows and the like. The restraining members are spaced inwardly from side walls of the chamber so that the glass-supporting pool of molten metal in the chamber, particularly in the vicinity of the end of the chamber at which molten glass is delivered to the chamber, is divided into three portion: a central portion between the restraining members upon which the glass is supported and two marginal portions, each between a restraining member and an associated side wall of the forming chamber from which the restraining member is inwardly spaced.

In practicing the invention, a flow of molten metal is established in the central portion of the pool of molten metal and the forming chamber, which flow is toward the location of molten glass delivery and therefore counter to the direction of advance of the layer of molten glass from the location of delivery to locations within the forming chamber downstream of the location of the delivery. Molten metal is caused to flow outwardly toward the restraining members and underneath an upstream portion of each restraining member at locations adjacent to the end of the forming chamber at which molten glass delivery occurs. The outwardly flowing molten metal is caused to flow beneath the surface of the pool of molten metal through openings in the restraining members and into each marginal portion of the pool of molten metal between the restraining members and the respective side walls.

The surface of the molten metal in each marginal portion of the pool is subjected to a wave action by forcing molten metal upwardly and tangentially along the surface of the pool. The wave action which is established effectively maintains the flow of molten metal already described and causes a continuum of flow in a downstream direction away from the glass delivery end of the forming chamber in the space between each restraining member and its associated side wall. As the molten metal flows from the space between a restraining member and its associated side wall and back into the main portion of the pool of molten metal which is in free communication with the central portion of the pool of molten metal residing between the restraining members, the wave action established at the surface of the molten metal is dampened. The surface wave action is dampened in order to avoid causing optical distortion in the glass being produced due to the creation of varying forces upon the bottom surface of the supported glass while it remains sufficiently fluid to change shape and at a temperature at which its viscosity is increasing sufficiently to prevent the ready relaxation of a nonuniform bottom surface.

In a preferred embodiment of the present method, the surface waves of the molten metal are dampened by forcing the molten metal to flow from the marginal portions of the pool of molten metal between the restraining members and the side walls of the chamber to the remainder of the pool of molten metal beneath the surface of the pool of molten metal. This may be accomplished by providing transverse end dams across from the downstream ends of the restraining members to the side walls and providing such end dams with subsurface openings.

According to the preferred embodiment of this invention, the means for causing surface waves in the molten metal comprises a rotatable impeller extending into the portion of the pool of molten metal in the space between the restraining member and the chamber side wall. Such a rotatable impeller has a series of molten metal-engaging faces for imparting lifting forces and tangential forces to the molten metal. The impeller may have a generally cylindrical shape and the faces may be provided with fins mounted on the cylindrically-shaped impeller with the faces of the fins serving to lift and force subsurface molten metal tangentially forward in the direction of impeller rotation. The rotatable impeller may be of generally cylindrical shape with its faces formed by a series of angular cuts in the impeller surface to provide alternating faces that are generally tangential and generally radial faces with the generally radial faces being the faces for imparting lifting forces and tangential forces to molten metal engaged by them during rotation of the impeller. The rotatable impeller may be made of a material that is substantially unwetted by molten metal such as graphite, for example, or the impeller may be made of a material that is substantially wetted by molten metal, such as a silica refractory. An impeller which is wetted by molten metal may be effectively employed to cause a greater wave action for a given size of a metal-engaging face on the impeller. The rotatable impeller may have any number of metal-engaging faces; however, for a given impeller speed wave action is increased in amplitude by employing an impeller having a small number of relatively large faces such as, for example, an impeller having four fins as compared to the wave action caused by a finned impeller of like diameter having eight or twelve fins. In any event, the speed at which the impeller is rotated is the dominant controlled variable for establishing the extent and degree of wave action and the rate of molten metal flow established in all three portions of the pool of molten metal in which the establishment of flow is desired.

Another embodiment of the invention employs the introduction of a gas, preferably an inert or a reducing gas, into the molten metal in a marginal portion of the pool of molten metal for causing waves in the surface of the molten metal in that portion of the pool. A mixture of hydrogen or nitrogen can be injected immediately beneath its surface of the molten metal either horizontally or with a slight upward component and generally in a downstream direction away from the end of the chamber at which molten glass is delivered to the chamber to establish such a wave action.

This invention may be further appreciated with reference to the accompanying drawings in which like reference numbers indicate like elements.

BRIEF DESCRIPTION OF THE DRAWINGS

FIG. 3 is a partial transverse cross-sectional perspective view showing in detail a rotatable impeller in combination with a restraining member inside a glass forming chamber;

FIG. 4 is a detailed perspective view of a notched restraining member having an opening through its lower upstream portion for permitting the outward flow of molten metal therethrough;

FIGS. 5 and 6 illustrate the head of a rotatable impeller comprising a cylindrical body having a plurality of fins mounted thereon; and FIGS. 7 and 8 illustrate another embodiment of a rotatable impeller, which embodiment comprises a generally cylindrical body having a plurality of angular cuts about its circumference and providing an alternating series of substantially tangential faces and radial faces.

DESCRIPTION OF THE PREFERRED EMBODIMENT

Figure 1:
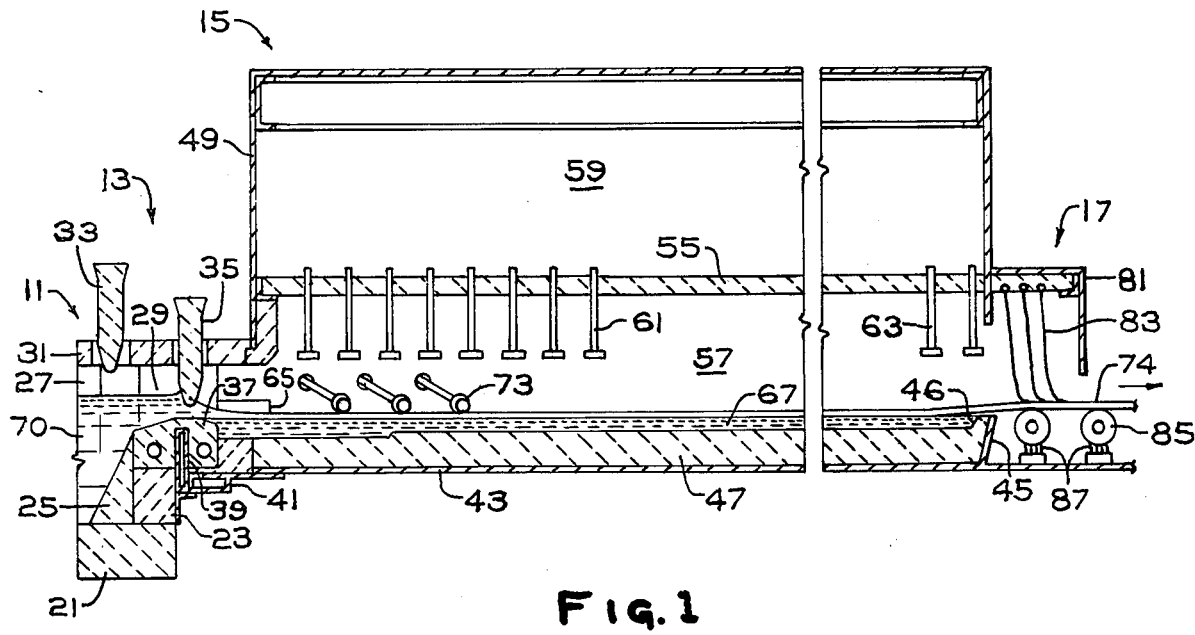
FIG. 1 is a partial, longitudinal cross-sectional elevation of a flat glass forming facility illustrating a glass forming chamber with associated means for conditioning and delivering molten glass to the chamber and means for drawing a continuous sheet or ribbon of glass from the forming chamber.
Figure 2:
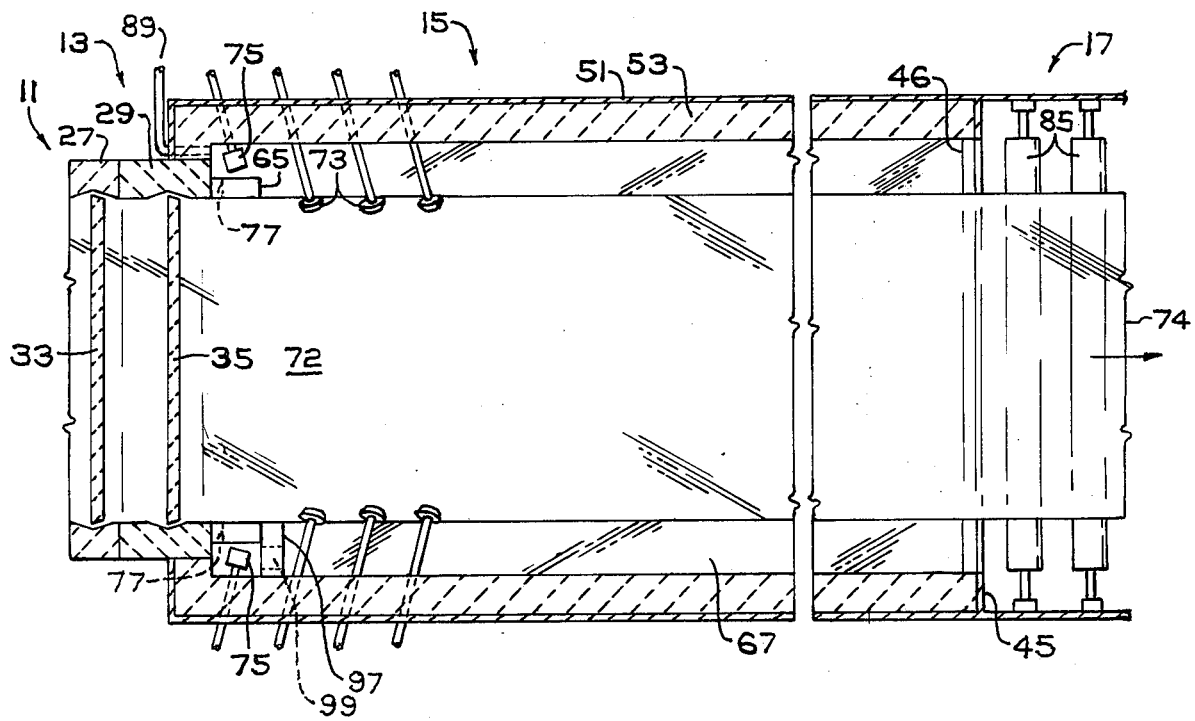
FIG. 2 is a longitudinal, cross-sectional plan view of the glass forming chamber illustrated in FIG. 1.

Referring now to FIGS. 1 and 2, there is illustrated a facility for continuously forming flat glass. The glass forming facility comprises a glassmaking furnace terminating in the discharge end of a refiner or conditioner 11 connected through a molten glass delivery facility 13 to an enclosed glass forming chamber 15, which, in turn, is connected to a facility 17 for removing a continuous sheet or ribbon of glass from the forming chamber 15. The conditioner or refiner 11 includes a refractory bottom 21 and a front basin wall 23 which may be provided with a refractory ramp 25 comprising one or more blocks. At the sides of the discharge end of the conditioner or refiner 11 are side members or jambs 27 and 29 and overlying the extreme end of the discharge end of the refiner or conditioner 11 and the molten glass delivery facility 13 is a roof, such as a flat arch 31. Mounted in a manner to provide for its being raised and lowered is a backup tweel 33 which can be lowered through an opening in the flat arch 31 to stop the flow of molten glass from the refiner or conditioner 11. Also mounted in a manner to permit its being raised or being lowered to control the rate of flow of molten glass from the refiner or conditioner 11 to the forming chamber 15 is an operating tweel 35 which extends downwardly through a transverse opening in the flat arch 31 and engages molten glass in the conditioner or refiner 11 and controls the rate of glass discharge from the conditioner or refiner and the rate of glass delivery to the forming chamber 15.

In addition to the tweels and jambs, the molten glass delivery facility 13 comprises a transverse threshold 37 for supporting a layer of glass during its delivery from the conditioner or refiner 11 directly onto molten metal in the forming chamber 15. The threshold 37 is preferably provided with an internal, vertical or substantially vertical cooler 39 which serves to maintain structural integrity of the threshold assembly and to control the temperature of the threshold during use. A bottom cooler 41 extending transversely beneath the threshold and beneath a portion of the forming chamber 15 is also preferably provided.

The enclosed forming chamber includes a bottom casing 43 preferably comprising an impervious metal plate such as steel. At the downstream or exit end of the forming chamber 15 there is provided an exit lip casing 45 and an exit 46 disposed within the exit lip casing. A refractory bottom liner 47 extends throughout the bottom of the forming chamber inside the bottom casing 43 and provides a container for holding a pool of molten metal. An upper casing 49 which is also preferably impervious and preferably constructed of steel plate extends over and around the upper portion of the forming chamber and includes side walls 51 which are provided with refractory side wall liners 53. A refractory ceiling 55 is preferably suspended inside the upper casing 49 to provide a headspace 57 spaced above the bottom of the forming chamber and a service space 59 spaced between the ceiling 55 and upper roof portion of the upper casing 49. Electric heaters are preferably mounted in the headspace 57 of a forming chamber. Several electric heaters 61 are provided in the upstream or hot portion of the forming chamber closest its inlet end where molten glass is delivered to it. Other heaters 63 may be provided in the ceiling 55 in the vicinity of the downstream or exit end of the forming chamber to incrementally adjust or control the temperature of a formed sheet or ribbon of glass immediately prior to lifting it and removing it from the forming chamber.

Guides or restraining members 65 are mounted within the forming chamber and extend in a downstream direction from the jambs 29. The bottom linear 47 of the forming chamber contains a pool of molten metal which is maintained between the threshold 37, the side wall liners 53 and the exit lip 46. During operation, a pool of molten glass 70 is maintained in the refiner/conditioner 11 and a layer of molten glass 72 is continuously delivered over the threshold 37 directly onto the surface of the glass-supporting pool of molten metal 67 as an advancing layer of molten glass from the location of its delivery toward the downstream or exit end of the forming chamber. The advancing layer of glass is preferably engaged in marginal portions by top rolls 73 which are angularly disposed and rotated at speeds sufficient to impart an advancing and stretching force to the layer of glass. Depending upon the thickness of glass being produced, the top rolls may be angled outwardly or inwardly. As the glass is advanced along the pool of molten metal 67, it is cooled by radiation to the side walls 53 and ceiling 55 of the forming chamber and by conductive heat transfer to the pool of molten metal 67 and on through the bottom of the forming chamber. The exterior of the forming chamber is cooled by natural and forced convection so that glass delivered to the chamber is continuously cooled. It is also possible to provide conventional radiant coolers such as water-cooled pipes extending through the headspace or through the supporting molten metal of the forming chamber. The heaters 61 are operated to control the rate of cooling by controlling the temperature of the ceiling 55 and its surroundings and thus influencing the rate of thermal radiation from the glass to it. Because of the cooling imposed upon the advancing layer of glass 72 and the forces applied to it, principally by the marginal glass-engaging rolls 73, a finished, dimensionally stable, continuous sheet or ribbon or glass 74 is produced.

The particular subcombination which characterizes this invention includes impellers 75 mounted in the spaces between the restraining member 77 and the side walls 53 of the forming chamber. The impellers 75 may be of paddle-wheel design that is generally cylindrical and having fins as illustrated in FIG. 3 particularly. The restraining members 65 are each provided with a subsurface opening, such as notch 77 at the upstream end of the restraining member shown in FIG. 4. The restraining members have inwardly disposed glass facing surfaces 78 and upstream surfaces 79 which preferably engage the jambs 29 and provide a continuum of lateral glass restraint at the location where glass passes from support by the threshold 37 to support by the pool of molten metal 67.

At the downstream or exit end of the forming chamber 15 there is provided a facility 17 for continuously withdrawing a continuous sheet or ribbon of glass from the forming chamber. This includes an overhead exit canopy 81 containing a plurality of drapes or seals 83 for isolating the headspace 57 of the forming chamber from the outside oxidizing environment. The facility for withdrawing a continuous sheet of glass from the forming chamber further includes exit rolls 85 which are provided with exit roll seals 87, again to prevent the ingress of air or other contaminants into the forming chamber. The rolls 85 provide a means for lifting and conveying a continuous sheet or ribbon of glass from the supporting pool of molten metal 67 and outwardly from the forming chamber 15. A further series of conveyer rolls (not shown) may be employed to convey the finished ribbon of glass to a coating station, annealing lehr or some other facility for further processing.

In the upper left-hand portion of FIG. 2 is illustrated one embodiment of this invention believed suitable for imparting surface waves to molten metal residing in the marginal portion of the pool of molten metal between a restraining member 65 and a side wall 53. A gas introduction tube 89 extends into the forming chamber, preferably just below the surface of the pool of molten metal. A gas, such as an inert or reducing gas or mixture of gases, may be introduced into the pool of molten metal with sufficient force to cause the molten metal to flow in a direction away from the gas entry point in a downstream direction between the restraining member 65 and the side wall 53 so that waves are established in the surface of the pool of molten metal in that region.

Referring now to FIGS. 5 and 6, there is shown a detailed view of an impeller head as illustrated perspectively in FIG. 3. This particular impeller head comprises a cylindrical portion 91 having a bore 93 for convenient connection to a drive shaft. A plurality of fins or blades 95 surround the cylindrical portion 91 of the impeller. Such an impeller may be machined from a block of material such as stainless steel, tungstenmolybdenum, graphite, clear fused quartz or other refractory material. The bore 93 in the head provides convenient means for attachment to a drive shaft such as the drive shaft employed for a glass edge-contacting machine disclosed in U.S. Pat. No. 3,929,444 and U.S. Pat. No. 3,709,673, both of which are incorporated by reference herein to disclose apparatus for rotating the impellers employed in the practice of this invention.

In preferred embodiments of this invention the internal bore of an impeller is provided with a plurality of longitudinal slots or keyways into which keys are fitted which also fit into keyways on a drive shaft. The keys are held in place by "O" rings or the like at the ends of the impeller. The keys lock the shaft to the impeller.

Illustrated in the lower left-hand portion of FIG. 2 is a subcombination suitable for dampening the wave action imparted to the molten metal in a marginal portion of a pool of molten metal so that molten metal flowing therefrom into a main portion of a pool of molten metal does not cause distortion in the glass being supported and formed thereon. A transverse end dam 97 extends between a side wall 53 and the downstream end of a glass restraining member. A bottom notch or opening 99 is provided through the end dam at an elevation that is beneath the surface of the pool of molten metal 67 maintained within the forming chamber. As molten glass having waves at its surface flows toward the end dam 97, it is forced downwardly through the opening 99 and the surface waves are substantially eliminated from the molten metal in that portion of the pool that is downstream of the end dam.

It is expected that in the practice of either of the alternative embodiments illustrated in FIG. 2 for this invention, that both the left and right sides of a forming chamber would be similarly arranged in a forming chamber. Thus, the practice for the region to either side of the center line of the forming chamber would be mirrored in the region on the other side of the forming chamber.

In FIGS. 7 and 8 there is illustrated another embodiment of an impeller head which may be employed in the practice of this invention. A basic cylindrical element 101 is provided with a central bore 103 for connection to a shaft for rotating the impeller. A plurality of cuts are made in the cylindrical surface to provide a plurality of substantially radial faces 105 and an alternating plurality of substantially tangential faces 107. As such an impeller is rotated in a counter clockwise direction (as viewed in FIG. 7), the radial faces 105 serve to impart a lifting in tangential force to molten metal into which the impeller dips. This causes a surface wave action in the molten metal and causes the molten metal to flow tangentially with respect to the rotating impeller.

While this invention has been described with particular reference to preferred embodiments for convenience of disclosure, those skilled in the art will realize further embodiments of the invention made evident by this disclosure. Accordingly, the appended claims, rather than the specific examples, define the scope of this invention.

We claim:

1. In a method of making flat glass wherein a layer of molten glass is delivered onto a pool of molten metal between a pair of spaced restraining members extending longitudinally from a location of molten glass delivery and spaced inwardly from side walls of the chamber containing the pool of molten metal and being at least partially submerged in the molten metal substantially along their longitudinal extent, the improvement which comprises establishing a flow of molten metal between the restraining members which is toward the location of molten glass delivery, causing the molten metal to flow outwardly under a submerged portion of each restraining member at locations adjacent to that of molten glass delivery and away from the location of molten glass delivery in portions of the pool of molten metal between the restraining members and the side walls of the chamber by establishing a wave action in the portions of the pool of molten metal between the restraining members and the side walls of the chamber and thereafter dampening the waves in the flowing molten metal in the remainder of the pool of molten metal.

2. The method according to claim 1 wherein the waves are dampened by forcing the molten metal to flow from the portions of the pool of molten metal between the restraining members and the side walls of the chamber to the remainder of the pool of molten metal beneath the surface of the pool of molten metal.

3. In an apparatus for making flat glass comprising an enclosed chamber containing a pool of glass-supporting molten metal and having a glass delivery end, chamber side walls and a pair of restraining members, each spaced from a side wall and spaced from each other, extending from the glass delivery end of the chamber, the improvement which comprises restraining members at least partially submerged in the pool of molten metal having openings through a lower portion of each of them in the vicinity of their ends adjacent the glass delivery end of the chamber and providing a subsurface communication between molten metal in a space between the restraining members and molten metal in the spaces between each restraining member and its closest chamber side wall, means for causing waves in the molten metal in the spaces between the restraining members and the chamber side walls for establishing a flow of molten metal between the restraining members toward the glass delivery end of the chamber, through the openings in the restraining members and away from the glass delivery end of the chamber thereafter directing the flow of molten metal back into a main portion of the pool of molten metal, and means, mounted adjacent the end of each restraining member remote from the glass delivery end of the chamber, for dampening the waves in the molten metal prior to directing the flow of molten metal back into the main portion of the pool of molten metal.

4. The apparatus according to claim 3 wherein each restraining member has an end dam mounted transversely across the space between the restraining member and the chamber side wall at the end of the restraining member remote from the glass delivery end of the chamber, the end dam having an opening through it beneath the surface of the pool of molten metal.

5. The apparatus according to claim 3 wherein the means for causing waves in the molten metal comprises a rotatable impeller extending into the portion of the pool of molten metal in the space between a restraining member and a chamber side wall, which rotatable impeller has a series of molten metal-engaging faces for imparting lifting and tangential forces to the molten metal.

6. The apparatus according to claim 5 wherein the rotatable impeller has a generally cylindrical shape and the faces are faces of fins mounted thereon.

7. The apparatus according to claim 5 wherein the rotatable impeller has a generally cylindrical shape and the faces are formed thereon by a series of angular cuts in the impeller providing alternating faces that are generally tangential and generally radial, the generally radial faces being the faces for imparting lifting and tangential forces to the molten metal.

8. The apparatus according to claim 5 wherein the rotatable impeller is made of material that is substantially unwetted by the molten metal.

9. The apparatus according to claim 5 wherein the rotatable impeller is made of material that is substantially wetted by the molten metal.

10. In an apparatus for making flat glass comprising an enclosed chamber containing a pool of glass-supporting molten metal and having a glass delivery end, chamber side walls and a pair of restraining members, each spaced from a side wall and spaced from each other, extending from the glass delivery end of the chamber, the improvement which comprises at least partially submerged restraining members having openings through a lower portion of each of them in the vicinity of their ends adjacent the glass delivery end of the chamber and providing a subsurface communication between molten metal in a space between the restraining members and molten metal in the spaces between each restraining member and its closest chamber side wall, and means for causing waves by the introduction of a gas into the molten metal in the spaces between the restraining members and the chamber side walls for establishing a flow of molten metal between the restraining members toward the glass delivery end of the chamber, through the openings in the restraining members and away from the glass delivery end of the chamber back into a main portion of the pool of molten metal.

* * * * *